United States Patent
Owen

(10) Patent No.: US 6,169,674 B1
(45) Date of Patent: Jan. 2, 2001

(54) TRANSFORMER, SYSTEM AND METHOD TO CONTROL HARMONIC DISTORTION

(75) Inventor: Donald W. Owen, Oklahoma City, OK (US)

(73) Assignee: Southwest Electric Company, Oklahoma City, OK (US)

(*) Notice: Under 35 U.S.C. 154(b), the term of this patent shall be extended for 0 days.

(21) Appl. No.: 09/048,868

(22) Filed: Mar. 26, 1998

(51) Int. Cl.$^7$ .................................................. H02M 7/00
(52) U.S. Cl. .......................... 363/64; 363/154; 336/5; 336/10; 336/12
(58) Field of Search .................. 363/64, 154; 336/5, 336/10, 12

(56) References Cited

U.S. PATENT DOCUMENTS

| | | | |
|---|---|---|---|
| 2,292,829 | * 8/1942 | Garin | 336/10 |
| 2,307,527 | 1/1943 | Maslin et al. | 172/238 |
| 2,812,488 | 11/1957 | Wright | 323/47 |
| 3,026,467 | 3/1962 | Barnes | 321/5 |
| 3,036,258 | 5/1962 | Friedrich | 321/5 |
| 3,339,107 | 8/1967 | Aldenhoff | 315/141 |
| 3,445,747 | 5/1969 | Laurent | 321/5 |
| 3,711,760 | * 1/1973 | Kaiser | 336/5 |
| 3,769,570 | 10/1973 | Stairs | 321/9 R |
| 4,106,089 | 8/1978 | Fettinger | 363/153 |
| 4,255,784 | 3/1981 | Rosa | 363/129 |
| 4,493,016 | 1/1985 | Cham et al. | 363/126 |
| 4,565,953 | 1/1986 | Espelage et al. | 318/345 E |
| 4,712,054 | 12/1987 | Boldt | 318/758 |
| 4,713,554 | 12/1987 | Henderson | 307/64 |
| 4,713,744 | 12/1987 | Coston | 363/160 |
| 4,761,726 | 8/1988 | Brown | 363/51 |
| 4,833,588 | 5/1989 | Schauder | 363/159 |
| 4,870,558 | 9/1989 | Luce | 363/87 |
| 4,876,634 | 10/1989 | Paice | 363/5 |
| 4,931,715 | 6/1990 | Lee et al. | 318/709 |
| 4,948,209 | 8/1990 | Baker et al. | 322/10 |
| 5,050,058 | 9/1991 | April et al. | 363/65 |
| 5,055,762 | 10/1991 | Disser et al. | 318/811 |
| 5,068,774 | 11/1991 | Rosa | 363/3 |
| 5,079,499 | 1/1992 | Owen | 323/361 |
| 5,130,628 | 7/1992 | Owen | 318/789 |
| 5,731,971 | * 3/1998 | Owen | 363/154 |

FOREIGN PATENT DOCUMENTS 1070-670   10/1984   (SU).

OTHER PUBLICATIONS

"Harmony Series Instruction Manual—Theory of Operation", Halmar–Robicon (circa Mar. 19, 1994).

"Lowering harmonic distortion in ac drives", *Machine Design*, Dec. 12, 1994, pp. 124–126.

* cited by examiner

Primary Examiner—Edward H. Tso
Assistant Examiner—Gary L. Laxton
(74) Attorney, Agent, or Firm—McAfee & Taft

(57) ABSTRACT

Harmonic distortion in a multiple phase power system is controlled by enabling different phase relationships to be set, and changed, in the field, between the devices being energized and the power source providing the energization. This has particular application, for example, in canceling harmonics caused by multiple six-pulse variable frequency drives used for controlling connected three-phase induction motors that operate electric submersible pumps. A transformer used to achieve this has two winding groups, each with two sets of contacts at different phase relationships.

13 Claims, 6 Drawing Sheets

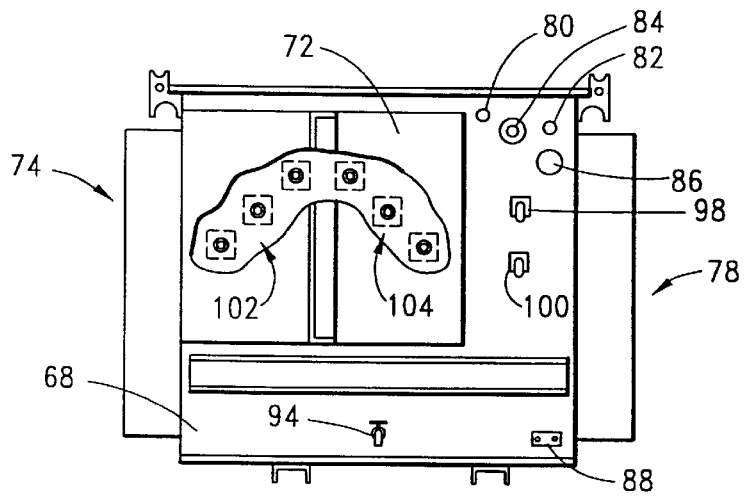
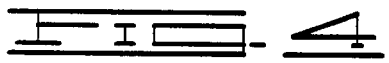
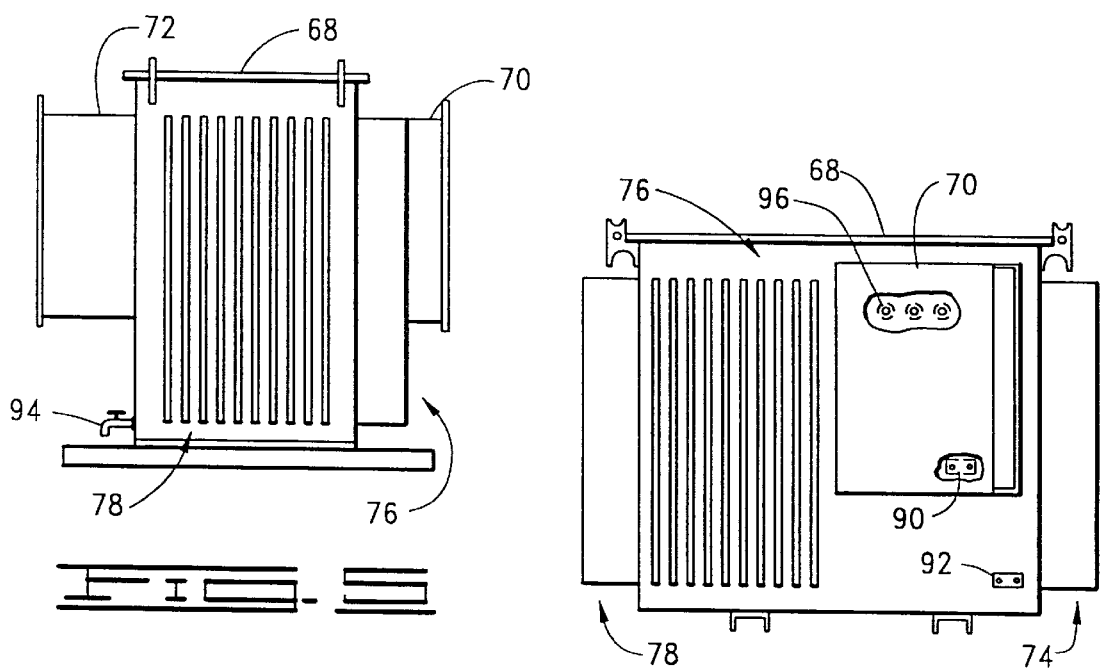
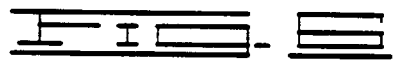

| DATE | SITE | ANGLE | S.TERM | SW#1 | SW#2 | S.AMPS | RATIO | P.AMPS | L1 | R1 | L2 | R2 |
|---|---|---|---|---|---|---|---|---|---|---|---|---|
|  |  |  |  |  |  |  |  |  |  |  |  |  |
| CUMULATIVE TOTAL PRIMARY CURRENT EACH ANGLE → |  |  |  |  |  |  |  |  |  |  |  |  |
| DATE | SITE | ANGLE | S.TERM | SW#1 | SW#2 | S.AMPS | RATIO | P.AMPS | L1 | R1 | L2 | R2 |
|  |  |  |  |  |  |  |  |  |  |  |  |  |
| CUMULATIVE TOTAL PRIMARY CURRENT EACH ANGLE → |  |  |  |  |  |  |  |  |  |  |  |  |
| DATE | SITE | ANGLE | S.TERM | SW#1 | SW#2 | S.AMPS | RATIO | P.AMPS | L1 | R1 | L2 | R2 |
|  |  |  |  |  |  |  |  |  |  |  |  |  |
| CUMULATIVE TOTAL PRIMARY CURRENT EACH ANGLE → |  |  |  |  |  |  |  |  |  |  |  |  |
| DATE | SITE | ANGLE | S.TERM | SW#1 | SW#2 | S.AMPS | RATIO | P.AMPS | L1 | R1 | L2 | R2 |
|  |  |  |  |  |  |  |  |  |  |  |  |  |

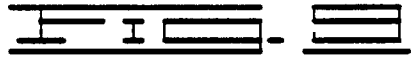

| DATE | SITE | ANGLE | S.TERM | SW#1 | SW#2 | S.AMPS | RATIO | P.AMPS | L1 | R1 | L2 | R2 |
|---|---|---|---|---|---|---|---|---|---|---|---|---|
|  | 1 | L1 | 1-2-3 | 1 |  | 20500 | 750 | 49.40 | 15.2 | 15.2 | 0 | 0 | 0 |
| CUMULATIVE TOTAL PRIMARY CURRENT EACH ANGLE → |  |  |  |  |  |  |  |  | 15.2 | 0 | 0 | 0 |
| DATE | SITE | ANGLE | S.TERM | SW#1 | SW#2 | S.AMPS | RATIO | P.AMPS | L1 | R1 | L2 | R2 |
|  | 2 | R1 | 4-5-6 |  | 1 | 20000 | 650 | 48.19 | 13.5 | 0 | 13.5 | 0 | 0 |
| CUMULATIVE TOTAL PRIMARY CURRENT EACH ANGLE → |  |  |  |  |  |  |  |  | 15.2 | 13.5 | 0 | 0 |
| DATE | SITE | ANGLE | S.TERM | SW#1 | SW#2 | S.AMPS | RATIO | P.AMPS | L1 | R1 | L2 | R2 |
|  | 3 | L2 | 1-2-3 |  | 2 | 20000 | 500 | 48.19 | 10.4 | 0 | 0 | 10.4 | 0 |
| CUMULATIVE TOTAL PRIMARY CURRENT EACH ANGLE → |  |  |  |  |  |  |  |  | 15.2 | 13.5 | 10.4 | 0 |
| DATE | SITE | ANGLE | S.TERM | SW#1 | SW#2 | S.AMPS | RATIO | P.AMPS | L1 | R1 | L2 | R2 |
|  | 4 | R2 | 4-5-6 |  | 2 | 19500 | 730 | 46.99 | 15.5 | 0 | 0 | 0 | 15.5 |
| CUMULATIVE TOTAL PRIMARY CURRENT EACH ANGLE → |  |  |  |  |  |  |  |  | 15.2 | 13.5 | 10.4 | 15.5 |
| DATE | SITE | ANGLE | S.TERM | SW#1 | SW#2 | S.AMPS | RATIO | P.AMPS | L1 | R1 | L2 | R2 |
|  | 5 | L2 | 1-2-3 |  | 2 | 20000 | 700 | 48.19 | 14.5 | 0 | 0 | 14.5 | 0 |
| CUMULATIVE TOTAL PRIMARY CURRENT EACH ANGLE → |  |  |  |  |  |  |  |  | 15.2 | 13.5 | 24.9 | 15.5 |
| DATE | SITE | ANGLE | S.TERM | SW#1 | SW#2 | S.AMPS | RATIO | P.AMPS | L1 | R1 | L2 | R2 |
|  | 6 | R1 | 4-5-6 | 1 |  | 20000 | 550 | 48.19 | 11.4 | 0 | 11.4 | 0 | 0 |
| CUMULATIVE TOTAL PRIMARY CURRENT EACH ANGLE → |  |  |  |  |  |  |  |  | 15.2 | 24.9 | 24.9 | 15.5 |
| DATE | SITE | ANGLE | S.TERM | SW#1 | SW#2 | S.AMPS | RATIO | P.AMPS | L1 | R1 | L2 | R2 |
|  | 7 | L1 | 1-2-3 | 1 |  | 19000 | 650 | 45.78 | 14.2 | 14.2 | 0 | 0 | 0 |
| CUMULATIVE TOTAL PRIMARY CURRENT EACH ANGLE → |  |  |  |  |  |  |  |  | 29.4 | 24.9 | 24.9 | 15.5 |
| DATE | SITE | ANGLE | S.TERM | SW#1 | SW#2 | S.AMPS | RATIO | P.AMPS | L1 | R1 | L2 | R2 |
|  | 8 | R2 | 4-5-6 |  | 2 | 19000 | 750 | 45.78 | 16.4 | 0 | 0 | 0 | 16.4 |
| CUMULATIVE TOTAL PRIMARY CURRENT EACH ANGLE → |  |  |  |  |  |  |  |  | 29.4 | 24.9 | 24.9 | 31.9 |

TRANSFORMER, SYSTEM AND METHOD TO CONTROL HARMONIC DISTORTION

BACKGROUND OF THE INVENTION

This invention relates generally to controlling harmonic distortion caused by devices connected to an alternating current power source. This invention includes a transformer, a system and a method with which to achieve this control.

One technique for controlling the speed of a three-phase induction motor uses an electronic variable frequency drive (VFD). The VFD has a rectifier circuit that requires multiple phases of alternating current electric power. For example, a six-pulse rectifier needs three phases of electric power to be input so that six pulses are provided by the full-wave rectification. Such multi-phase rectifiers have other uses as well (e.g., for providing direct current for a d.c. motor used in ski lifts or for a d.c. heater used in industrial processes).

Although multi-phase rectifiers are useful, they cause detrimental harmonic currents to flow in the power systems which energize them. For example, the current in a six-pulse VFD is heavily laden with fifth and seventh harmonics. Harmonic currents can cause system components such as transformers and generators to overheat. Harmonic currents also can cause voltage distortion. Voltage distortion can cause electronic devices to malfunction and capacitors to overheat. Multiple rectifiers energized from one power source intensify the harmonic problems because increasing the number of operating rectifiers usually increases the total drive load.

Primary system filters can be used to prevent or attenuate this harmonic distortion. Such filters are, however, designed and applied for a predetermined amount of total drive load, which load cannot always be known with certainty prior to an actual installation. Even when initially predicted, the load may be changed as rectifiers are added to or removed from the system; this can necessitate a change in the filter because the total drive load that can be connected to a filtered system is limited by the design of the filter and not by the capacity of the power system. Additionally, such filters typically are relatively large and expensive.

In view of the foregoing, there is the need for an improved technique for controlling harmonic distortion in a power system without having to use primary system filters.

SUMMARY OF THE INVENTION

The present invention overcomes the above-noted and other shortcomings of the prior art by providing a novel and improved transformer, system and method with which to achieve control of harmonic distortion in power circuits.

The present invention controls harmonic distortion by enabling different phase relationships to be set, and changed, in the field, between the devices being energized and the power source providing the energization. This has particular application, for example, in canceling harmonics caused by multiple six-pulse variable frequency drives used for controlling connected three-phase induction motors that operate electric submersible pumps. The present invention can also be used with twelve-pulse and twenty-four-pulse VFDS, but it can be used with power rectifiers in general and even non-rectifier loads.

The present invention allows the phase relationship primary to secondary of a transformer to be adjusted in the field. In a particular implementation, the phase relationship is adjustable to any one of four different phase angles on 15° increments.

With the present invention, the loads can be distributed approximately equally among the different phase angles during installation. Then later, the load distribution can be re-adjusted to compensate for changes in the number, location and size of the loads. This field adjustability allows the harmonic cancellation to be optimized.

Canceling harmonic currents with the present invention requires relatively little engineering when compared to the design and use of harmonic filters. With the present invention, the load is simply distributed on the available phase angles; and this process continues as additional drives are installed. Primary system filters, on the other hand, must be designed and applied for a predetermined amount of total rectifier load. Often the future load cannot be known with any degree of certainty.

With the present invention, future rectifier additions properly made will not affect the loading of existing units. With primary system harmonic filters, on the other hand, adding rectifier load increases the loading on the existing filters. This is true even if a separate power user adds load on the common power system at a separate location.

With the present invention, the total rectifier load is limited by the system capacity. This is distinguishable from a filtered system in which the total rectifier load that can be connected is limited by the design of the filter and not the capacity of the system.

The present invention can supply three-phase power to rectifier or non-rectifier applications. That is, a transformer of the present invention can be used instead of conventional transformers even if the future use (i.e., device to be energized via the transformer) is unknown. Conversely, some specialized transformers (e.g., "circuit thirty-one," or delta-wye secondary transformers) used with twelve-pulse rectifiers cannot supply power to a non-rectifier load at full kVA. In the present invention, when a drive is removed from service, permanently or for maintenance, the transformer of the present invention can carry the full kVA, fixed speed, load.

With the present invention, the cost of reducing detrimental harmonic current is reduced. The primary system harmonics can be reduced without the use of filters or special drive rectifier sections. The fifth, seventh, eleventh, thirteenth, seventeenth and nineteenth harmonics can be reduced significantly.

A transformer of the present invention comprises a first winding group having two sets of contact points disposed at respective locations of first phase displacement in the first winding group. The transformer further comprises a second winding group electromagnetically coupled to the first winding group. The second winding group has two sets of contact points disposed at respective locations of second phase displacement in the second winding group. The second phase displacement is different from the first phase displacement. The transformer still further comprises means for connecting either a multiple phase alternating current power source or a multiple phase load device to at least a selected one of the two sets of contact points of the first winding group and means for connecting the other of the multiple phase load device or the multiple phase alternating current power source to at least a selected one of the two sets of contact points of the second winding group. In at least one implementation, this enables any one of four phase relationships between the multiple phase load device and the multiple phase alternating current power source to be selected. In a particular implementation of the transformer, each of the first and second winding groups includes at least one respective plurality of windings connected in a respective closed circuit.

The present invention also includes a three-phase power system providing selectable control over harmonic distortion and comprising a three-phase alternating current power source and a plurality of three-phase loads connected to the power source. Each of the three-phase loads includes a device and a three-phase transformer. Each transformer comprises a first winding group having two sets of contact points disposed at respective locations of first phase displacement in the first winding group, wherein one of the two sets of contact points is connected to the power source. Each transformer also comprises a second winding group electromagnetically coupled to the first winding group, the second winding group having two sets of contact points disposed at respective locations of second phase displacement in the second winding group, wherein the second phase displacement is different from the first phase displacement and wherein one of the two sets of contact points of the second winding group is connected to the device. The set of contact points of the first winding group of a respective transformer connected to the power source, and the set of contact points of the second winding group of the respective transformer connected to the respective device, are selected for each transformer such that harmonic distortion caused by the plurality of three-phase loads on the power source is attenuated. In a particular implementation, each device is a six-pulse rectifier.

The method of the present invention attenuates harmonic distortion in a three-phase power system having an alternating current power source and a plurality of devices to be energized by the power source through respective transformers. Each of these transformers has a construction including: a primary winding group with two phase displaced sets of three-phase inputs, and a secondary winding group with two phase displaced sets of three-phase outputs. The method comprises: determining the number and size of devices to be connected for energization by the power source; assigning one of four phase relationships for each device to be connected for energization by the power source; for each device assigned a first of the four phase relationships, connecting the respective device to a first of the two phase displaced sets of three-phase outputs of the secondary winding group of a respective one of the transformers and connecting a first of the two phase displaced sets of three-phase inputs of the primary winding group of the respective transformer to the power source; for each device assigned a second of the four phase relationships, connecting the respective device to a second of the two phase displaced sets of three-phase outputs of the secondary winding group of a respective one of the transformers and connecting the first of the two phase displaced sets of three-phase inputs of the primary winding group of the respective transformer to the power source; for each device assigned a third of the four phase relationships, connecting the respective device to the first of the two phase displaced sets of three-phase outputs of the secondary winding group of a respective one the transformers and connecting a second of the two phase displaced sets of three-phase inputs of the primary winding group of the respective transformer to the power source; and for each device assigned a fourth of the four phase relationships, connecting the respective device to the second of the two phase displaced sets of three-phase outputs of the secondary winding group of a respective one of the transformers and connecting the second of the two phase displaced sets of three-phase inputs of the primary winding group of the respective transformer to the power source.

Therefore, from the foregoing, it is a general object of the present invention to provide a novel and improved transformer, system and method with which to achieve control of harmonic distortion in a power circuit. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 4 is an exterior side view of the transformer of FIG. 3.

FIG. 6 is an exterior side view opposite the side shown in FIG. 4.

FIG. 8 is a schematic and vector representation of a further preferred embodiment transformer of the present invention.

FIG. 9 is a representation of part of a blank log that can be used in performing the method of the present invention.

FIG. 10 is a representation of part of a completed log used in performing the method of the present invention.

DETAILED DESCRIPTION OF THE INVENTION

Figure 1:
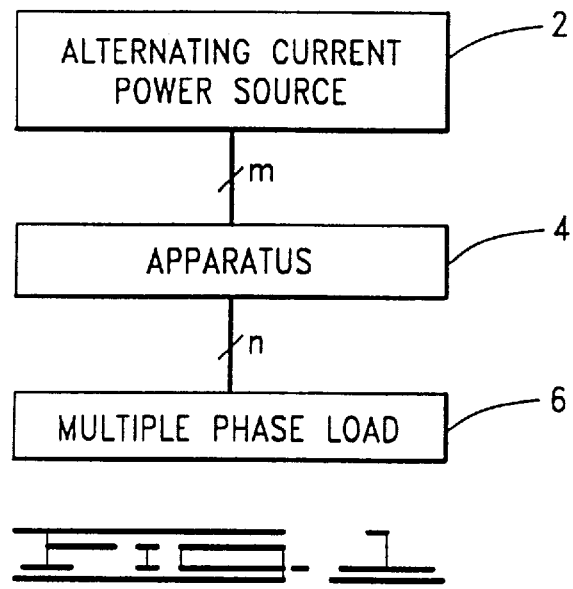
FIG. 1 is a block diagram representing a system of the present invention.

A multiple phase power system providing selectable control over harmonic distortion in accordance with the present invention is represented in FIG. 1. An alternating current power source 2 provides a predetermined number of phases of electric power to a changeable load configuration wherein each load element is represented by a respective transformer 4 and load device 6 to be energized from the power source 2 through the respective transformer 4. The number of transformers 4 and devices 6 used in the system can be varied; however, in the system of the present invention, for each device 6 there is at least one transformer 4 connected between the alternating current power source 2 and the respective device 6 in the manner described subsequently in this specification.

In a particular implementation, the power source 2 is a conventional three-phase power source such as from a public utility. The voltage output from such source can be as desired, but one example is 13,800 volts(ac).

Each load device 6 of the preferred embodiment of the present invention is a multiple phase energized device. A non-limiting example of such a device is a six-pulse rectifier of a variable frequency drive that controls a three-phase induction motor which operates an electric submersible pump. The devices 6 can, however, be other particular implementations as long as they are within the rating of a particular implementation of the respective transformer 4. In the system of the present invention, all of the devices 6 are powered by the common power source 2; and the present invention is provided to attenuate or reduce, and preferably to minimize, the harmonic currents flowing in the system.

The transformers 6 of the preferred embodiment system of the present invention all are of the same construction to provide economies of manufacturing, ordering and maintaining inventories. Each transformer 6 can be used as a conventional, full kVA transformer of comparable rating.

Each transformer 6 of the preferred embodiment is a three-phase transformer which is connectable to the power source 2 and the three-phase load device 6. The transformer 4 impresses con a connected load device 6 a three-phase secondary voltage that is selectively phase displaced relative to the three-phase system voltage provided by the power source 2.

Each transformer 4 has two winding groups, either of which may be referred to as a first winding group or a second winding group and either functioning as either the primary, input side of the transformer or the secondary, output side of the transformer. One winding group has two sets of contact points disposed at respective locations of a first phase displacement, and the other winding group has two sets of contact points disposed at respective locations of second phase displacement. The second phase displacement is different from the first phase displacement. The two winding groups are electromagnetically coupled, such as by both being wound on a common iron core.

One of the two sets of contact points of the winding group functioning as the primary side of the transformer is connected to the power source 2, and one of the two sets of contact points of the other winding group is connected to the respective device 6. The set of contact points connected to the power source 2 and the set of contact points connected to the respective device 6 are selected such that harmonic distortion caused by all the connected loads on the power source is reduced and preferably minimized.

Figure 7:
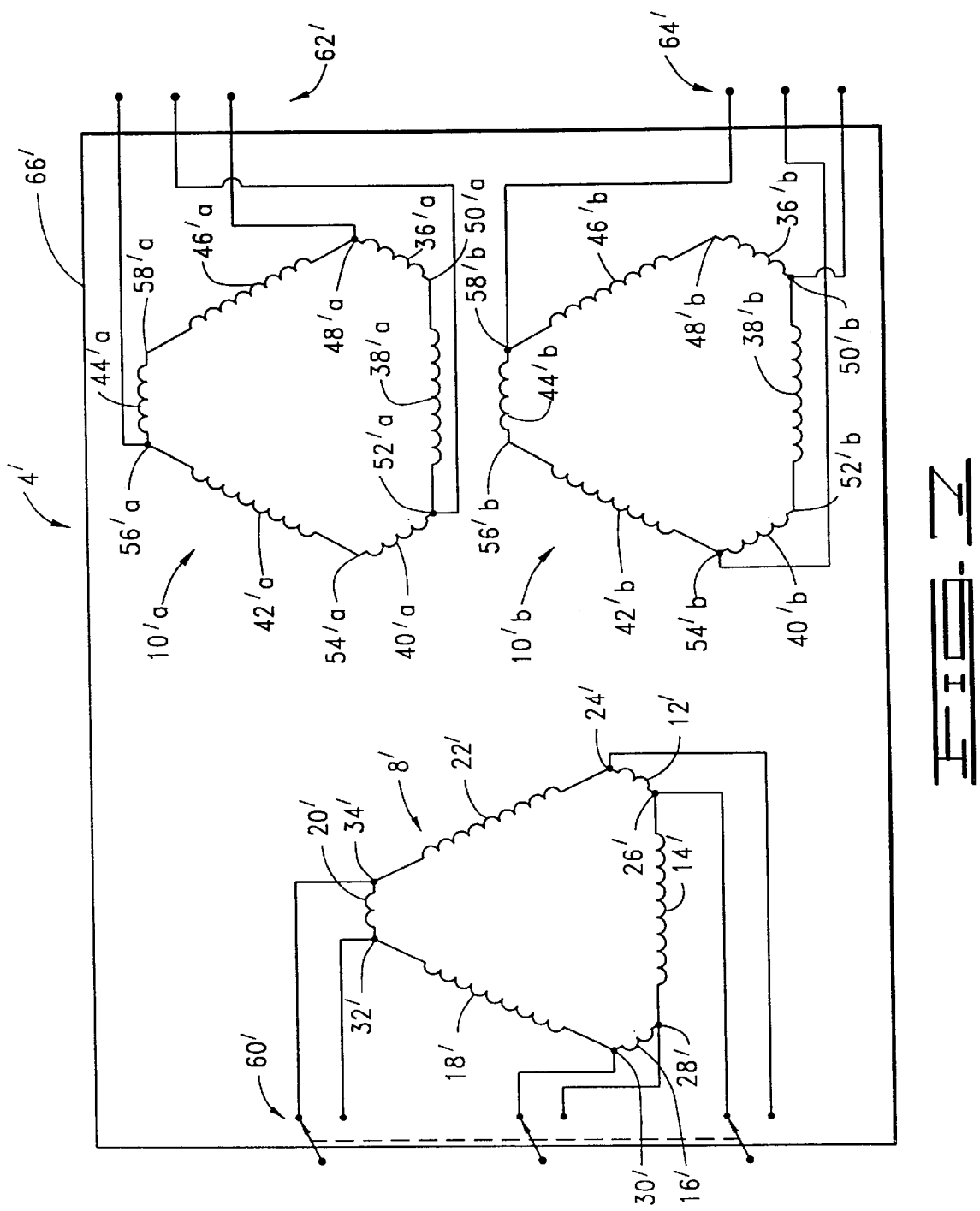
FIG. 7 is a schematic and vector representation of another preferred embodiment transformer of the present invention.

In the preferred embodiment, each winding group comprises at least one respective plurality of windings connected in a respective closed circuit. The terminology "closed winding circuit" and the like used in this specification and in the claims refers to a respective set of distinct windings of electrical conductor material connected in electrical series such that a closed electric circuit is made by the respective windings of the particular set of windings. More specifically, a closed winding circuit of the present invention is one that (1) does not have any connections that are common to the windings of all the phases (e.g., it does not have a common neutral node as in a wye or zig-zag winding configuration), and (2) has at least six windings connected in a closed polygon, and (3) has at least two sets of three contact points that have three-phase symmetry and are the same three-phase voltage magnitude (one of the two sets may or may not be used in a particular transformer depending on the winding group construction as will become apparent below in the discussion of FIGS. 2, 7 and 8). This is at least one winding configuration which can produce outputs from the series-connected ends of the windings that may be represented by vector phase relationships graphically depicted by polygon-shaped diagrams. Such a vector phase relationship is an important characteristic of the present invention, so the term "polygon-vector" may be used as an adjective defining a particular type of winding circuit of the present invention in accordance with the foregoing and as illustrated in FIGS. 2, 7 and 8.

Figure 2:
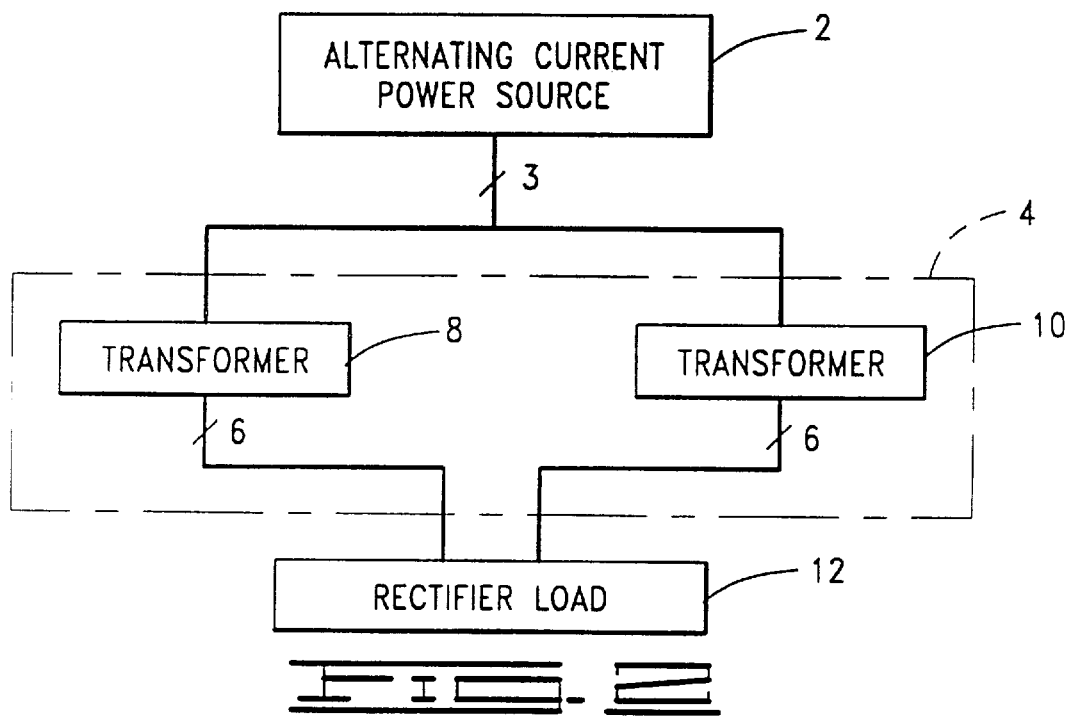
FIG. 2 is a schematic and vector diagram of a preferred embodiment transformer of the present invention.

Referring to FIG. 2, a particular implementation of the transformer 4 of the present invention will be described. The transformer 4 of FIG. 2 includes a closed winding circuit 8 and a closed winding circuit 10. Although each of the winding circuits 8, 10 is physically connected in a closed circuit, the representations in FIG. 2 are not representations of the physical disposition of the windings of the circuits 8, 10, but rather are depictions of the vector phase diagram for each respective winding circuit. Each such winding circuit includes greater and fewer turn windings represented in their electrical phase relationships by the longer and shorter sides of the polygons depicted in FIG. 2.

The closed winding circuit 8 includes a set of six windings 12, 14, 16, 18, 20, 22 connected in a closed polygon having six nodes 24, 26, 28, 30, 32, 34. The three nodes 24, 28, 32 define one of the two sets of contact points, and the other three nodes 26, 30, 34 define the other of the two sets of contact points of the winding circuit 8. The six windings 12–22 are serially connected. Each contact point is on a series connecting segment between a respective two of the windings. Each set of three contact points defines a respective three-phase port to which a three-phase voltage can be input or from which a three-phase voltage can be output. A three-phase voltage at one of these three-phase ports is phase displaced relative to a three-phase voltage at the other three-phase port. The phase displacement depicted in FIG. 2 is 15°.

For a fifteen electrical degree phase displacement, the turns ratio between two serially connected windings theoretically is (sin 52.5°/sin 7.5°):1, which is approximately 6.078:1. In an actual transformer, however, windings are typically wound to integer multiples of half turns; therefore, in practice the turns ratio needs to be "about" (sin 52.5°/sin 7.5°):1. One example of what constitutes "about" this ratio (and thereby to achieve an "about" 15° phase displacement) includes eighteen turns for each of the windings 14, 18, 22 represented in FIG. 2 by the longer sides of the phase diagram for the winding circuit 8 and three turns for each of the windings 12, 16, 20, which gives a ratio of 6.000:1 (within 13 parts in 1,000 of the desired theoretical ratio). Another example is 39.5 turns for each of the windings 14, 18, 22 and 6.5 turns for each of the windings 12, 16, 20, providing a ratio of approximately 6.077:1 (within 2 parts in 10,000 of the desired theoretical ratio).

The closed winding circuit 10 includes a set of six windings 36, 38, 40, 42, 44, 46 connected in a closed polygon having six nodes 48, 50, 52, 54, 56, 58. The three nodes 48, 52, 56 of this other set of six windings defines one of the two sets of contact points of this winding circuit 10, and the three nodes 50, 54, 58 of this other set of six windings defines the other of the two sets of contact points of this winding circuit. The six windings 36–46 are serially connected. Each of the contact points 48–58 is on a respective series connecting segment between a respective two of the windings of this closed winding circuit. Each set of three contact points defines a respective three-phase port to which a three-phase voltage can be input or from which a three-phase voltage can be output. A three-phase voltage at one of these three-phase ports is phase displaced relative to a three-phase voltage at the other of these three-phase ports. The phrase displacement depicted in FIG. 2 for this winding group is 30°.

For a thirty electrical degree phase displacement, the turns ratio between two serially connected windings theoretically is (sin 45°/sin 15°):1, which is approximately 2.732:1. Since in an actual transformer windings are typically wound to integer multiples of half turns, in practice the turns ratio needs to be "about" (sin 45°/sin 15°):1. One example of what constitutes "about" this ratio (and thereby to achieve an "about" 30° phase displacement) includes 5.5 turns for each of the windings 38, 42, 46 represented in FIG. 2 by the longer sides of the phase diagram for the winding circuit 10 and 2 turns for each of the windings 36, 40, 44, which gives a ratio of 2.750:1 (within 7 parts in 1,000 of the desired theoretical ratio). Another example is 295 turns for each of the windings 38, 42, 46 and 108 turns for each of the windings 36, 40, 44, providing a ratio of approximately 2.731:1 (within 2 parts in 10,000 of the desired theoretical ratio).

Because of the serial connection of the six windings of each winding circuit 8, 10 in the embodiment of FIG. 2, the full load rating of the transformer can be accommodated by any single three-phase output provided through any set of three associated output terminals (i.e., any one of sets of contact points 24, 28, 32; 26, 30, 34; 48, 52, 56; 50, 54, 58).

The transformer 4 depicted in FIG. 2 further includes means for connecting either the alternating current power source 2 or the respective load device 6 to a selected one of the two sets of contact points of one winding group. The transformer 4 also includes means for connecting the other of the load device 6 or the alternating current power source 2 to a selected one of the two sets of contact points of the other winding group. In particular, there is one connector (which can include multiple components) adapted to connect an external three-phase line to a selected one of the two three-phase ports of one winding group, and another connector (which can include multiple components) adapted to connect an external three-phase line to a selected one of the other two three-phase ports defined in the other winding group (a "three-phase line" encompasses any mechanism or component that connects to or otherwise communicates the three-phase electricity to or from the connectors of the transformer; one non-limiting example is a three conductor power cable). With the transformer 4 arranged such that the power source 2 is connected to one of two sets of input points and the load device 6 is connected to one of two sets of output points, the degree of phase displacement from primary to secondary in the transformer of the present invention is user selectable. The selection of the three input points and the three output points is accomplished by physically connecting conductors to external terminals or, alternately, by operating integral selector switches, or, alternately, using fixed terminals for either the input or output and one or more switches for the other of the output or input. This last option is illustrated in FIG. 2 in which (1) a three-pole ganged switch 60 selectably connects the poles to either the set of contact points 24, 28, 32 or the set of contact points 26, 30, 34, and (2) fixed terminals 62, 64 connect to the sets of contact points 48, 52, 56 and 50, 54, 58, respectively. With the respective two sets of input and output ports, the phase angle selectability is such that the secondary voltage can have any of four different phase angle relationships to the primary system. For the particular implementation illustrated in FIG. 2 and described above, the four different phase angles are at increments of approximately fifteen electrical degrees relative to each other.

The transformer 4 is also represented in FIG. 2 as including a single housing 66 having the two winding groups disposed therein in known manner (e.g., in an oil filled compartment) and having the connecting means mounted thereon in known manner (e.g., in fluid sealed, electrically insulated fashion). Thus, each transformer 4 of the preferred embodiment is a wholly self-contained three-phase input/three-phase output transformer.

Figure 5:
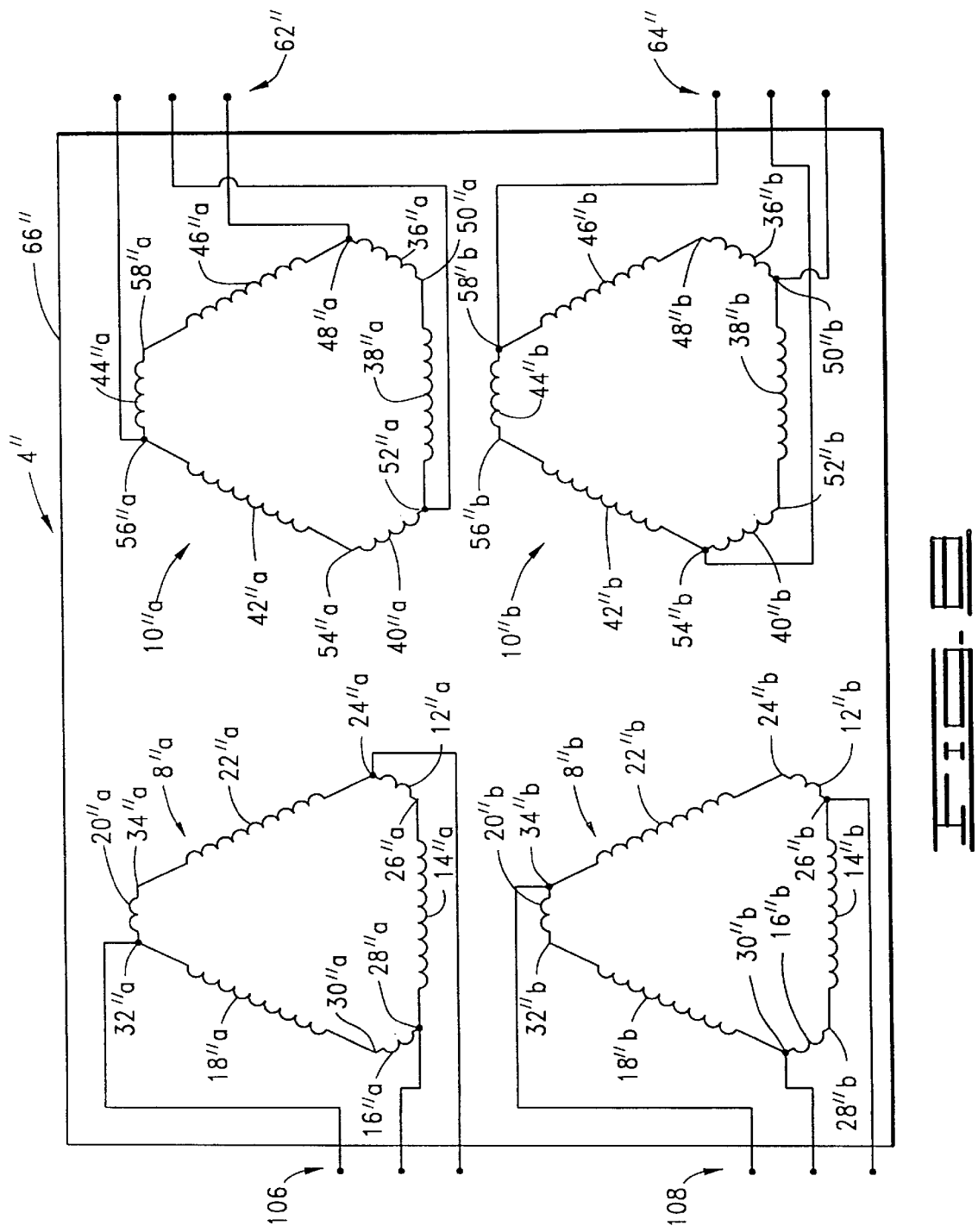
FIG. 5 is an exterior end view of the transformer in FIG. 3.
Figure 1:
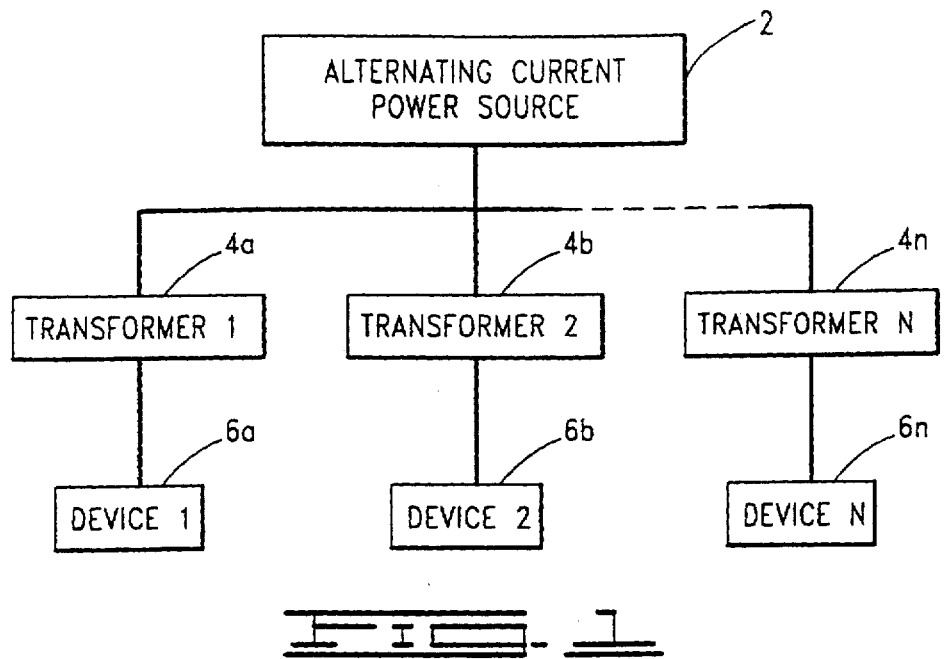
Figure 3:
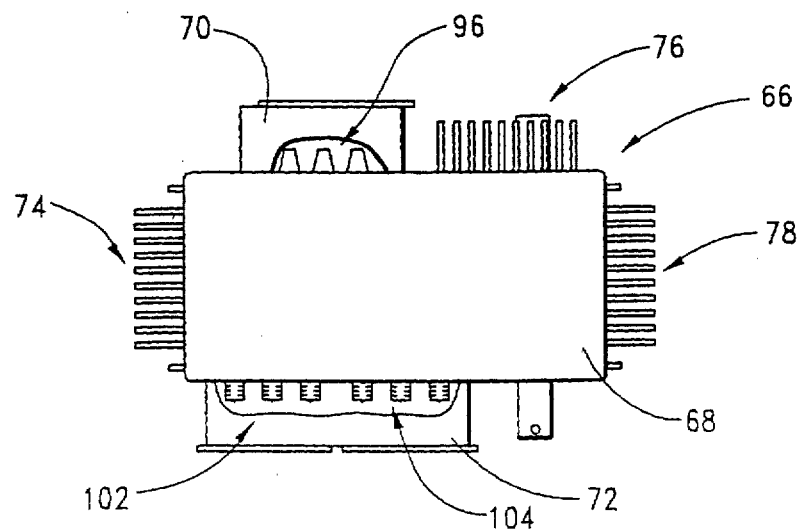

Exterior views of a particular implementation of the transformer of FIG. 2 are shown in FIGS. 3–6. The housing 66 includes a main compartment 68 with attached input terminal compartment 70 and attached output terminal compartment 72. The main compartment 68 contains the closed winding circuits 8, 10 and the body of cooling oil in which the windings are submerged. Attached to the main compartment 68 are cooling panels 74, 76, 78. Also mounted on the main compartment 68 are a pressure relief device 80, a fill plug 82, a liquid level gauge 84, and a temperature gauge 86 (FIG. 4). Grounding provision is made such as at locations 88 (FIG. 4) and 90, 92 (FIG. 6). A drain valve 94 with sampler is shown in FIGS. 4 and 5.

Figure 3:
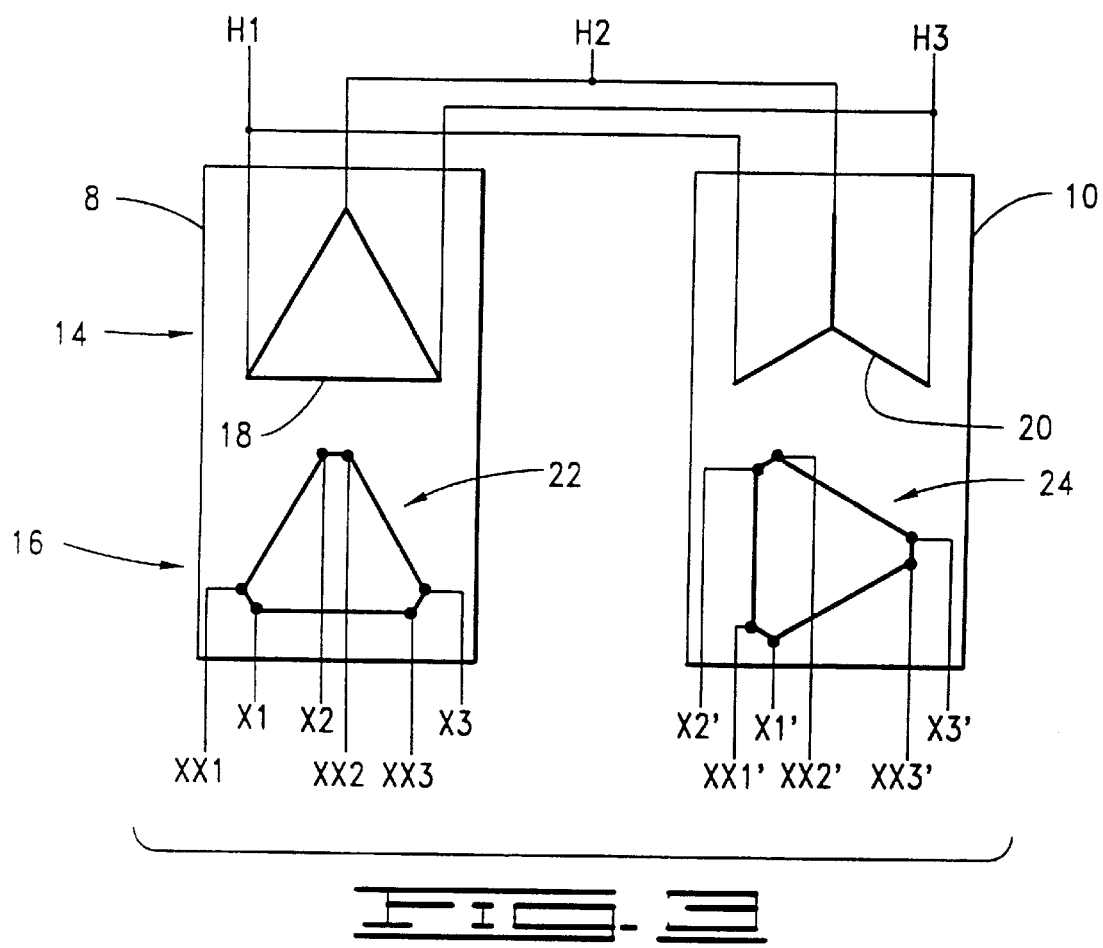
FIG. 3 is an exterior plan view of a particular implementation of the transformer of FIG. 2.

The input terminal compartment 70 houses primary bushings 96 (FIGS. 3 and 6). Each bushing 96 is connected to a respective one of the poles of the switch 60 shown in FIG. 2, thereby making the winding circuit 8 the primary winding of this implementation of the transformer of the present invention. The switch 60 is actuated by a handle 98 shown only in FIG. 4. A handle 100 is also shown in FIG. 4. This handle operates a switch that compensates for primary system voltage variation; this switch does not affect the phase angle relationship, but it does affect the calculated primary current magnitude relative to the secondary current.

The output terminal compartment 72 houses a group of secondary bushings 102 and a group of secondary bushings 104 (FIGS. 3 and 4). Each of the bushings 102 is connected to a respective one of the contact points 48, 52, 56 of the closed winding circuit 10 shown in FIG. 2; and each of the bushings 104 is connected to a respective one of the contact points 50, 54, 58 of the closed winding circuit 10 of FIG. 2. Thus, the winding circuit 10 is the secondary in this implementation of the transformer of the present invention.

Referring to FIG. 7, another embodiment of the transformer of the present invention will be described. This transformer, designated with the reference numeral 4', has one winding group that includes two closed winding circuits 10'a, 10'b. Each of these is configured the same as the closed winding circuit 10 shown in FIG. 2 as indicated by like reference numerals. The closed winding circuit 10'a provides one set of three contact points to external terminals 62', and the closed winding circuit 10'b provides one set of three contact points to external terminals 64'. Each of the winding circuits 10'a, 10'b can be constructed to handle the full kVA rating of the transformer 4'; however, more preferably, they can be constructed to handle a lesser amount but such that the combination of the outputs from terminals 62', 64' provide two phase-displaced three-phase outputs suitable for driving a twelve-pulse rectifier, for example. In this preferred case, the contact points 50'a, 54'a, 58'a of winding circuit 10'a and contact points 48'b, 52'b, 56'b of winding circuit 10'b can be provided to external terminals for selectable connection with the corresponding in-phase three contact points (i.e., the like numbered contact points) of the other winding circuit to provide a full kVA output. For some examples of usage of the possible combinations of the contact points of winding circuits 10'a, 10'b used as outputs, see U.S. Pat. No. 3,036,258 to Friedrich and U.S. Pat. No. 5,079,499 to Owen, both of which are incorporated herein by reference.

Still referring to the transformer 4' of FIG. 7, the winding circuit 8' is configured the same as the winding circuit 8 of the embodiment shown in FIG. 2.

The three winding circuits 8', 10'a, 10'b are contained in a single housing 66' which can be the same as shown in FIGS. 3–6.

Still another embodiment of the transformer of the present invention is shown in FIG. 8. This transformer is designated with the reference numeral 4". This embodiment has winding circuits 10"a, 10"b configured the same as winding circuits 10'a, 10'b shown in FIG. 7. The transformer 4" is different, however, in that it has two separate closed winding circuits 8"a, 8"b for the winding circuit group corresponding to the group shown in the FIG. 2 embodiment as having only one closed winding circuit 8. The configuration of each of the winding circuits 8"a, 8"b is constructed the same as the one winding circuit 8 shown in FIG. 2 if each winding circuit 8"a, 8"b is to handle full kVA (thus making such an implementation less practical, at least as to cost, than one using only a single winding circuit 8). The three contact points 24"a, 28"a, 32"a from the winding circuit 8"a are connected to external terminals 106, and the three contact points 26"b, 30"b, 34"b from the winding circuit 8"b are connected to external terminals 108.

In the preferred embodiment of the system of the present invention depicted in FIG. 1, each transformer 4 has the same construction of a primary winding group with two phase displaced sets of three-phase inputs and a secondary winding group with two phase displaced sets of three-phase outputs such as described above with reference to FIGS. 2, 7 and 8. To use these transformers in the system in accordance with the method of the present invention for attenuating harmonic distortion in a multiple phase (specifically three-phase) power system, one first determines the number, location and size of load devices 6 to be connected for energization by the power source 2. For the particular transformers shown in FIGS. 2, 7 and 8, one of four phase relationships can be assigned for each device to be connected for energization by the power source.

Referring to the implementation of FIG. 2, for each device assigned a first of the four phase relationships, the respective device 6 is connected to a first of the two phase displaced sets of three-phase outputs of the secondary winding group of a respective one of the transformers, and a first of the two phase displaced sets of three-phase inputs of the primary winding group of the respective transformer is connected to the power source. If the winding circuit 8 of the transformer 4 shown in FIG. 2 is used as the primary and if the winding circuit 10 is used as the secondary, then the aforementioned connections of the device 6 and the power source 2 could be to the three-phase port including contact points 48, 52, 56 and the three-phase port including contact points 24, 28, 32, respectively. That is, for this use of the FIG. 2 implementation, the respective device 6 would be connected to the terminals 62 and the power source 2 would be connected to the poles of the switch 60 and the switch 60 would be switched to its other position from its present position shown in FIG. 2.

For each device assigned a second of the four phase relationships, the respective device 6 is connected to a second of the two phase displaced sets of three-phase outputs of the secondary winding group of a respective one of the transformers (e.g., contact points 50, 54, 58/connector terminals 64), and the first of the two phase displaced sets of three-phase inputs of the primary winding group of the respective transformer (e.g., contact points 24, 28, 32/switch 60 in position switched from that shown in FIG. 2) is connected to the power source 2.

For each device assigned a third of the four phase relationships, the respective device 6 is connected to the first of the two phase displaced sets of three-phase outputs of the secondary winding group of a respective one the transformers (e.g., contact points 48, 52, 56/connector terminals 62), and a second of the two phase displaced sets of three-phase inputs of the primary winding group of the respective transformer (e.g., contact points 26, 30, 34/switch 60 in position shown in FIG. 2) is connected to the power source 2.

For each device assigned a fourth of the four phase relationships, the respective device 6 is connected to the second of the two phase displaced sets of three-phase outputs of the secondary winding group of a respective one of the transformers (e.g., contact points 50, 54, 58/connector terminals 64), and the second of the two phase displaced sets of three-phase inputs of :he primary winding group of the respective transformer (e.g., contact points 26, 30, 34/switch 60 in position shown in FIG. 2) is connected to the power source 2.

As load devices are added or deleted, it may be necessary to selectably change the assigned phase relationship for a respective device in response to a change in the number or location or size of the devices connected for energization by the power source and to make corresponding changes in the connections of the respective transformer in response to a change in the assigned phase relationship for the respective device.

A more detailed explanation of the foregoing method follows.

An object of the method of the present invention is to minimize the harmonic current in the primary system by distributing respective loads on transformers of the present invention set at different phase angles. Primary system current that flows as a result of the total load current is the significant quantity. Preferably, primary current is determined by measuring each secondary current and dividing by the respective transformer ratio; however, horsepower or KW is a good approximation for relative load size but does not take into account adjustment made in the transformer ratio.

Each of the embodiments of the transformer of the present invention shown in FIGS. 2, 7 and 8 provides two phase angle pairs. The two phase angles within a pair are 30° apart and the two pairs are offset 15° for the illustrated embodiments. One of the phase angle pairs will be referred to as L1 paired with R1. L1 and R1 are for the outputs from the two sets of secondary terminals 62, 64, respectively, with primary switch 60 set on position 1 (the other position from that shown in FIG. 2). The other phase angle pair will be referred to as L2 paired with R2. L2 and R2 are for the outputs from the two sets of secondary terminals 62, 64, respectively, but with primary switch 60 set on position 2 (the position shown in FIG. 2).

Two six-pulse loads that are similar in size and that are located relatively close together should be matched on a pair of phase angles that are 30° part, for example, L1 of one transformer and R1 of another transformer. The process of matching loads that are located close together on alternate pairs of 30° angles is important because the harmonics in localized sections of the system are reduced, not just at the source. Then, two other loads that are located relatively close together and relatively close to the previous two units and that are similar in size should be matched on the other pair of phase angles, L2 and R2, set on two other transformers. After the phase angles of the first four transformers and their loads are designated, continue the same process of allocating pairs of loads, as evenly as possible, on the two pairs of phase angles, L1-R1 and L2-R2. The total load on each phase angle should be approximately equal.

A log can be used to aid in distributing the drive load. The log may be used effectively whether or not a plan or map is used. The log preferably is used to adjust the pre-allocated phase angles as units are commissioned or de-commissioned. The log lists operating loads with a cumulative, total primary current on each phase angle. A portion of one type of a log is shown in FIG. 9.

At the time of commissioning each load, the respective transformer of the present invention is set on the phase angle that has the least total load. The log of FIG. 9 can be used to identify which of the phase angles is loaded least. For the load that is to be commissioned next, the respective transformer is set with the phase angle that presently has the least total calculated primary current. Use the cumulative total connected load recorded on the log to determine this.

A portion of a sample log is shown in FIG. 10. Its use is in accordance with the following:

1. Blocks are provided for the commissioning date and a site name or number.
2. Enter one of the phase angle designations, L1, R1, L2 or R2, for the unit being commissioned, in the block labeled "ANGLE". Connect the load being commissioned to the appropriate secondary terminals X1, X2, X3 (terminals; 62 in FIG. 2) or X4, X5, X6 (terminals 64 in FIG. 2) and record 1-2-3 or 4-5-6 under "S.TERM". Set primary switch #1 (switch 60 in FIG. 2) on the appropriate position and record 1 or 2 under "SW #1".
3. Enter the voltage rating of the primary tap selected under "SW #2".
4. Enter the steady state current flowing in the transformer secondary lines under "S.AMPS".
5. Enter the transformer ratio for the selected position of switch #2. The ratio is the line-to-line voltage rating of the selected primary tap divided by the rated line-to-line secondary voltage. Example: 21000 divided by 415 equals 50.60.
6. Enter the primary current of the individual site load under "P.AMPS". The primary current is the measured secondary current of step 4 divided by the transformer ratio calculated in step 5.
7. Enter the primary current of step 6 in only one of the last four blocks and enter 0 in the other three blocks. Choose the block that is appropriate for the phase angle entered in the "ANGLE" block in step 2.
8. Enter the accumulated total primary current for each phase angle for all units commissioned and decommissioned.

A previously commissioned load may be off line temporarily and in that case the actual current in the primary will be different from the log totals but this should not cause a problem. One drive, temporarily off line, out of many, should not be significant.

INSTALLATION PROCEDURE WITH A SMALL NUMBER OF LOADS

A principal objective with a small number of loads is to cancel as much of the fifth and seventh harmonics of the largest load as possible. Maximum cancellation of the fifth and seventh harmonics occurs when the largest load is paired with an equal load, at 30° phase displacement. The bulk of the fifth and seventh harmonics will be canceled even if the loads are only approximately equal.

To accomplish this, set the largest one of the loads on phase angle L1; then, out of the remaining drives, find the combination of one or more loads whose total load matches most closely the largest load and set that group of loads on phase angle R1. For any remaining loads, follow the procedure of setting each subsequent load on the phase angle that is loaded least.

Example, two six-pulse rectifiers:

To reduce the fifth and seventh harmonic currents for two six-pulse rectifiers, the phase angle relationship of the two units should be 30° apart, for example, one on L1 and the other on R1.

Example, three rectifiers, equally loaded or nearly equally loaded:

To reduce the harmonics through the nineteenth when used with three, nearly equally loaded, six-pulse rectifiers, the phase angle settings should be L1, R1 and L2. Any three of the phase angle settings may be used, provided they are all different.

Example, three rectifiers, unequally loaded:

The optimum phase angles with three unequally loaded six-pulse rectifiers depend on the relative load sizes.

The first step, regardless of the three load sizes, is to set the phase angles of the largest unit and the mid-sized unit 30° apart, L1 and R1, respectively. Then the third unit will be set on R1 or L2 depending on whether Case 1 or Case 2 below applies.

Relative load size determines whether Case 1 or Case 2 applies. Let B represent the largest of the three loads, M the mid-sized of the three, S the smallest of the three, and T the sum M+S.

Case 1 is where B is closer to T than to M.

For Case 1 the largest load is set on phase angle L1 and both of the other two loads are set on phase angle R1.

Example of Case 1: Three drive loads: 1000 HP, 600 HP and 500 HP.

B=1000, M=600, S=500 and T=(600+500)=1100

In this example B=1000 is closer to T=1100 than to M=600. Therefore, the phase angle setting should be L1 for the 1000 HP unit and R1 for both of the other two units.

Case 2 is where B is closer to M than to T.

For Case 2, the largest load is set on phase angle L1, the mid-sized load on R1 and the smallest on L2.

Example of Case 2: Three drive loads: 1000 HP, 900 HP and 500 HP.

B=1000, M=900, S=500 and T=(900+500)=1400

In this example B=1000 is closer to M=900 than to T=1400. Therefore, the phase angle settings for the three units should be L1 for the 1000 HP unit, R1 for the 900 HP unit and L2 for the 500 HP unit.

MULTIPLE LOADS ON A COMMON TRANSFORMER

The foregoing has generally pertained to each load having a respective transformer, with each transformer being set for the appropriate phase angle as determined above. It is noted, however, that two or more similarly sized six-pulse rectifiers (or other load devices) may be connected to a common transformer of the present invention.

The fifth and seventh harmonic currents are not only eliminated from the system but also from the transformer windings if the loads are equal. If the loads are not equal, the fifth and seventh harmonics are still reduced depending on the relative total load on each set of secondary terminals.

The total load applied to a transformer must, of course, be no greater than the rating of the transformer. Divide the total load, as closely as possible, into two equal loads. Then, regardless of the number of drives in each group, connect one of the two load groups on X1-X2-X3 (terminals 62) and the other on X4-X5-X6 (terminals 64).

MULTIPLE TRANSFORMERS FOR MULTIPLE PULSE RECTIFIERS

Although one transformer of the present invention can be constructed to provide outputs for a six-pulse or twelve-pulse rectifier, two transformers can be used together to provide 30° phase displaced, six-phase, isolated power for one twelve-pulse rectifier. Likewise, two or four transformers can be used for one twenty-four pulse rectifier needing 15° phase displaced twelve-phase power.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

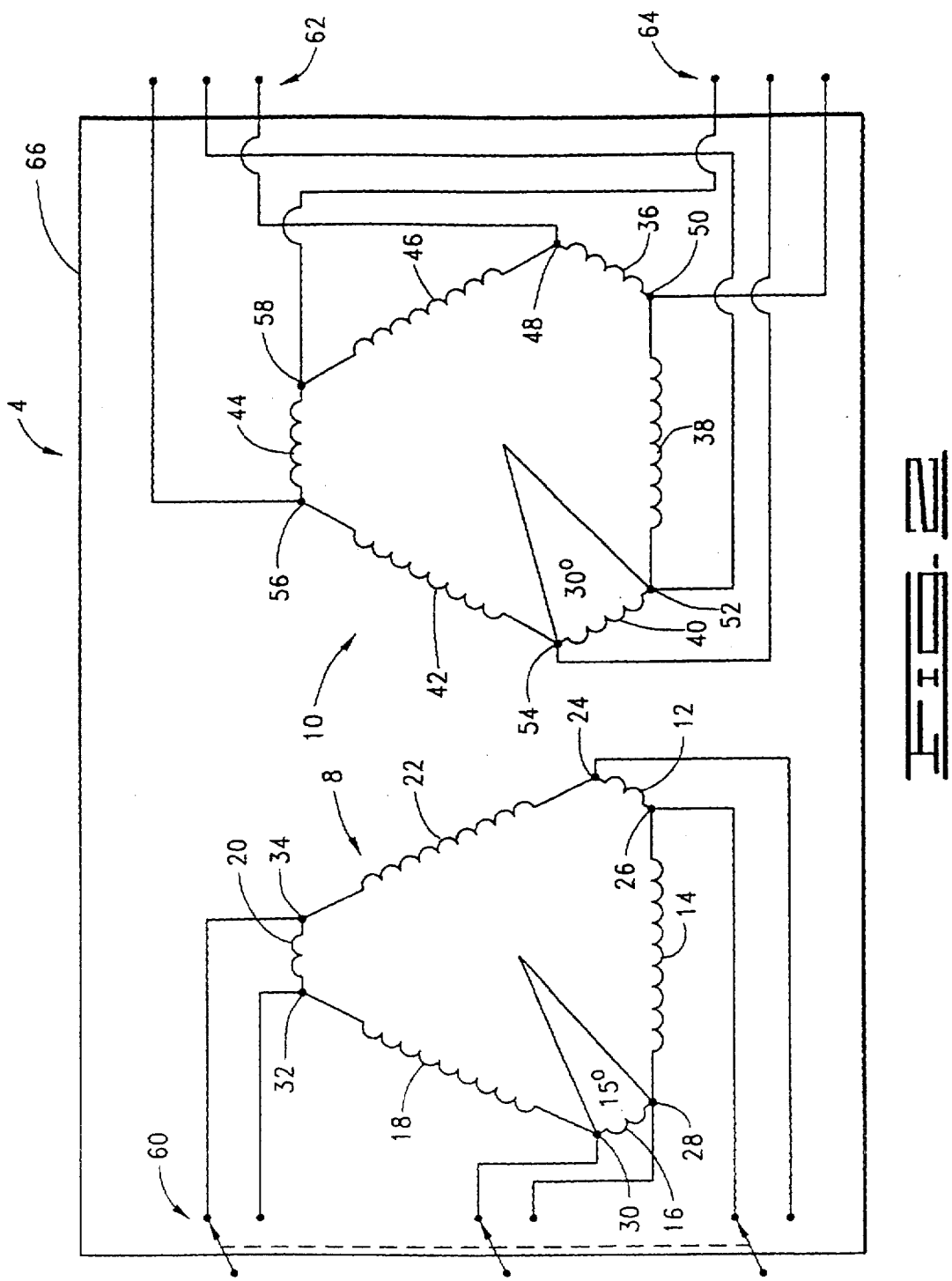

What is claimed is:

1. A three-phase transformer, comprising:
    a first closed winding circuit including six windings serially connected to define six contact points wherein each contact point is on a series connecting segment between a respective two of said findings and wherein three of said contact points define a first three-phase port and the other three of said contact points define a second three-phase port such that a three-phase voltage at said first three-phase port is phase displaced by a first phase displacement relative to a three-phase voltage at said second three-phase port;
    a second closed winding circuit electromagnetically coupled to said first closed winding circuit, said second closed winding circuit including six windings serially connected to define six contact points wherein each of these contact points is on a respective series connecting segment between a respective two of said windings of said second closed winding circuit and wherein three of said contact points of said second closed winding circuit define a third three-phase port and the other three of said contact points of said second closed winding circuit define a fourth three-phase port such that a three-phase voltage at said third three-phase port is phase displaced by a second phase displacement relative to a three-phase voltage at said fourth three-phase port;
    a housing having said first and second closed winding circuits disposed therein;
    a first connector connected to said housing and to said first and second three-phase ports such that said first connector is adapted to connect an external three-phase line to a selected one of said first and second three-phase ports; and
    a second connector connected to said housing and to said third and fourth three-phase ports such that said second connector is adapted to connect an external three-phase line to a selected one of said third and fourth three-phase ports.

2. A three-phase transformer as defined in claim 1, wherein said first phase displacement is about 15° and said second phase displacement is about 30°.

3. A three-phase power system providing selectable control over harmonic distortion, comprising:
    a three-phase alternating current power source; and
    a plurality of three-phase loads connected to said power source, each of said three-phase loads including:
        a device; and
        a three-phase transformer, comprising:
            a first winding group having two sets of contact points disposed at respective locations of first phase displacement in said first winding group, wherein one of said two sets of contact points is connected to said power source; and
            a second winding group electromagnetically coupled to said first winding group, said second winding group having two sets of contact points disposed at respective locations of second phase displacement in said second winding group, wherein said second phase displacement is different from said first phase displacement and wherein one of said two sets of contact points of said second winding group is connected to said device;
    wherein the set of contact points of said first winding group of a respective said transformer connected to said power source and the set of contact points of said second winding group of the respective said transformer connected to the respective said device are selected for each said transformer such that harmonic distortion caused by said plurality of three-phase loads on said power source is attenuated.

4. A system as defined in claim 3, wherein said first phase displacement is about 15° and said second phase displacement is about 30°.

5. A system as defined in claim 3, wherein said first phase displacement is about 30° and said second phase displacement is about 15°.

6. A system as defined in claim 3, wherein each of said first and second winding groups includes a respective plurality of windings connected in a respective closed circuit to define the respective said two sets of contact points.

7. A three-phase power system as defined in claim 3, wherein:
    said first winding group includes one plurality of windings connected in a closed circuit to define at least one of said two sets of contact points of said first winding group; and
    said second winding group includes two pluralities of windings, each of said two pluralities connected in a respective closed circuit to define a respective one of said two sets of contact points of said second winding group.

8. A three-phase power system as defined in claim 3, wherein said first winding group includes a second plurality of windings connected in a respective closed circuit to define the other of said two sets of contact points of said first winding group.

9. A system as defined in claim 3, wherein:
    said first winding group of each said transformer includes a set of six windings connected in a closed polygon having six nodes, three of said nodes defining one of the two sets of contact points of said first winding group and the other three of said nodes defining the other of the two sets of contact points of said first winding group; and
    said second winding group of each said transformer includes another set of six windings connected in a closed polygon having six nodes, three of said nodes of this other set of six windings defining one of the two sets of contact points of said second winding group and the other three of said nodes of this other set of six windings defining the other of the two sets of contact points of said second winding group.

10. A system as defined in claim 3, wherein each said transformer further includes a single housing having said first and second winding groups of the respective said transformer disposed therein.

11. A system as defined in claim 3, wherein each said device is a six-pulse rectifier.

12. A method of attenuating harmonic distortion in a three-phase power system having an alternating current power source and a plurality of devices to be energized by the power source through respective transformers, each transformer having a construction including a primary winding group with two phase displaced sets of three-phase inputs and a secondary winding group with two phase displaced sets of three-phase outputs, said method comprising:

determining the number and size of devices to be connected for energization by the power source;

assigning one of four phase relationships for each device to be connected for energization by the power source;

for each device assigned a first of the four phase relationships, connecting the respective device to a first of the two phase displaced sets of three-phase outputs of the secondary winding group of a respective one of the transformers and connecting a first of the two phase displaced sets of three-phase inputs of the primary winding group of the respective transformer to the power source;

for each device assigned a second of the four phase relationships, connecting the respective device to a second of the two phase displaced sets of three-phase outputs of the secondary winding group of a respective one of the transformers and connecting the first of the two phase displaced sets of three-phase inputs of the primary winding group of the respective transformer to the power source;

for each device assigned a third of the four phase relationships, connecting the respective device to the first of the two phase displaced sets of three-phase outputs of the secondary winding group of a respective one the transformers and connecting a second of the two phase displaced sets of three-phase inputs of the primary winding group of the respective transformer to the power source; and for each device assigned a fourth of the four phase relationships, connecting the respective device to the second of the two phase displaced sets of three-phase outputs of the secondary winding group of a respective one of the transformers and connecting the second of the two phase displaced sets of three-phase inputs of the primary winding group of the respective transformer to the power source.

13. A method as defined in claim 12, further comprising selectably changing the assigned phase relationship for a respective device in response to a change in the number of devices to be connected for energization by the power source and making corresponding changes in the connections of the respective transformer in response to a change in the assigned phase relationship for the respective device.

* * * * *

UNITED STATES PATENT AND TRADEMARK OFFICE
CERTIFICATE OF CORRECTION

PATENT NO. : 6,169,674 B1
DATED : January 2, 2001
INVENTOR(S) : Donald W. Owen

It is certified that error appears in the above-identified patent and that said Letters Patent is hereby corrected as shown below:

Title page,
Under "FOREIGN PATENT DOCUMENTS," delete "10/1984" and insert
-- 01/1984 -- therefor.

Delete sheets 1 and 2 of the drawings and replace them with sheets 1 and 2 attached hereto.

Column 1,
Line 60, "VFDS" and insert -- VFDs -- therefor.

Column 5,
Line 9, delete "con" and insert -- on -- therefor.

Column 11,
Line 17, after "terminals," first occurrence, delete ";".

Column 13,
Line 20, delete "findings" and insert -- windings -- therefor.

Signed and Sealed this

Eighth Day of January, 2002

*Attest:*

*Attesting Officer*

JAMES E. ROGAN
*Director of the United States Patent and Trademark Office*